(12) United States Patent
Hedding

(10) Patent No.: US 7,721,756 B2
(45) Date of Patent: May 25, 2010

(54) ONE-PIECE SPRING AND POPPET INCORPORATED INTO A VALVE SEAT ASSEMBLY AND ASSOCIATED METHOD FOR MANUFACTURING A ONE-PIECE SPRING AND POPPET

(76) Inventor: Paul Hedding, 121 S. Main St., Ste 8, Chelsea, MI (US) 48118

( * ) Notice: Subject to any disclaimer, the term of this patent is extended or adjusted under 35 U.S.C. 154(b) by 101 days.

(21) Appl. No.: 11/681,354

(22) Filed: Mar. 2, 2007

(65) Prior Publication Data

US 2008/0210898 A1    Sep. 4, 2008

(51) Int. Cl.
*F16K 15/00* (2006.01)
(52) U.S. Cl. .................. 137/540; 137/543.17
(58) Field of Classification Search .................. 137/538, 137/514.5, 540, 543.17, 543.13, 513.3
See application file for complete search history.

(56) References Cited

U.S. PATENT DOCUMENTS

| | | | |
|---|---|---|---|
| 2,447,729 A | 8/1948 | Bertea | |
| 2,875,779 A * | 3/1959 | Campbell | 137/529 |
| 2,930,401 A * | 3/1960 | Cowan | 137/540 |
| 2,959,188 A * | 11/1960 | Kepner | 137/540 |
| 3,550,617 A * | 12/1970 | Johnson | 137/514.5 |
| 3,583,431 A | 6/1971 | Diel | |
| 3,626,977 A | 12/1971 | Riley et al. | |
| 3,903,923 A | 9/1975 | Loup et al. | |
| 4,432,389 A | 2/1984 | Jackson et al. | |
| 4,558,630 A * | 12/1985 | Leppala | 91/420 |
| 5,072,950 A | 12/1991 | Littleproud et al. | |
| 5,255,713 A | 10/1993 | Scholle et al. | |
| 5,275,376 A | 1/1994 | Rich | |
| 5,332,000 A | 7/1994 | Gassner | |
| 6,513,546 B2 * | 2/2003 | Katsura | 137/540 |
| 6,722,628 B1 | 4/2004 | Seil | |
| 6,729,347 B2 | 5/2004 | Ittlinger et al. | |

FOREIGN PATENT DOCUMENTS

| | | |
|---|---|---|
| EP | 1388672 | 2/2004 |
| WO | WO-8600681 | 1/1986 |

\* cited by examiner

*Primary Examiner*—John Rivell
*Assistant Examiner*—Macade Brown
(74) *Attorney, Agent, or Firm*—Gifford, Krass, Sprinkle, Anderson & Citkowski, P.C.

(57) ABSTRACT

A combined spring and poppet assembly incorporated into a valve housing which communicates with a fluid inlet and outlet. The integral assembly includes an elongated and three dimensional shaped, resilient body positioned in linearly displaceable fashion within the valve housing, and along a path established between the fluid inlet and outlet. The body includes a forward-most disposed poppet which seats against the fluid inlet in a normally flow disrupting fashion. The body further includes an integrally formed spring biasing portion. Upon a pressure in the fluid inlet exceeding a predetermined value, the poppet being caused to unseat from the inlet and to displace linearly against the spring portion, concurrent with fluid flow being established across the outlet.

9 Claims, 3 Drawing Sheets

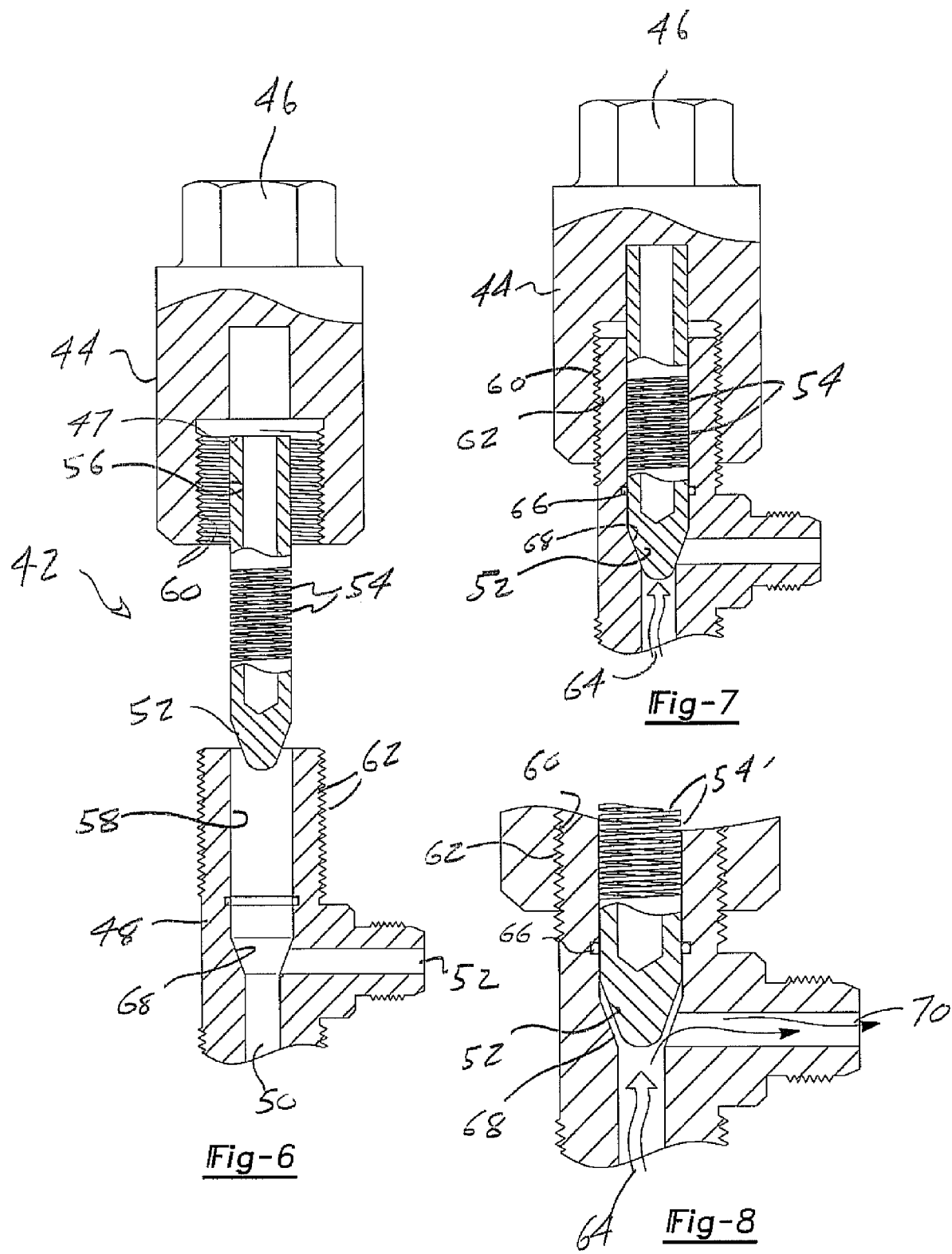

ONE-PIECE SPRING AND POPPET INCORPORATED INTO A VALVE SEAT ASSEMBLY AND ASSOCIATED METHOD FOR MANUFACTURING A ONE-PIECE SPRING AND POPPET

BACKGROUND OF THE INVENTION

1. Field of the Invention

The present invention relates generally to valve seat assemblies for various not limited to such as check valve and pressure relief applications. More specifically, the present invention discloses a novel and unique one-piece combined spring and poppet, such as which is produced by a helically turned piece of material, the one-piece design providing improved performance and reduced incidence of breakage as compared to prior art and multi-piece spring and poppet assemblies.

2. Description of the Prior Art

The prior art is well documented with various types of valve configurations, including most notably those incorporated into check and pressure relief valve assemblies. A first example of a valve assembly incorporating a plasticized poppet is disclosed in Scholle et al., U.S. Pat. No. 5,255,713, and which includes a central disc part and tapered flange for engaging a valve seat. A plurality of three integrally formed beams extends from the disc portion and is received in an annular groove defined in an inner wall of the valve body. The integrally formed beams act as biasing leaf springs providing a resilient force to bias the poppet in a closed position. In this assembly, the valve unit is constructed of two pieces including a plastic valve and the internally displaceable poppet and leaf springs.

Another reference of note is disclosed in U.S. Pat. No. 3,626,977, issued to Riley, and which teaches a combination check and pressure relief valve in which a lightweight poppet valve member is held closed by a calibrated spring and supplemented by a floating self-aligning resilient O-ring seal held against dilation by an encircling channel-shaped retainer ring. Of note, the poppet and O-ring are held captive by a one-piece cage permanently assembled between the surrounding valve housing components welded seams, the cage being contoured to provide separate stops for the poppet and the O-ring retainer unit.

U.S. Pat. No. 5,332,000, issued to Glassner, teaches a close tolerance fluid pressure relief or check valve (low pressure sensitive valve) including a one-piece silicone poppet within a valve body. The poppet makes line contact with a concave seat surface at the inlet end of the body when the poppet is closed. A stem of the poppet extends into an inlet passage of the body to guide poppet movement centrally between open and closed positions. The poppet is biased to its closed position by a spring within the body, the pressure setting of which is controlled by a threaded nut or fitting defining an outlet passage and closing the outlet end of the body.

Another reference of interest is set forth in PCT/WO application No. 86/00681, to Brunswick Valve and Control, Inc., and which teaches an in-line check valve having combined downstream poppet support and flow control elements. The poppet-type check valve utilizes an integral detachable flow control assembly for insertion into a cooperating housing. The checking poppet is oriented with its actuating stem, concentric guide, and concentric force bias spring downstream of the check flow controlled orifice. In a preferred embodiment, the flow control assembly is located internal of a housing having a first flow length adjacent the controlled flow orifice and seat. A second converging flow length abuts the first flow length and a terminating flow outlet is adjacent the valve outlet port.

Shortcomings of the prior art spring and poppet designs include the requirement that the article be fabricated from a number of different components and which, upon being assembled together and installed within the desired valve housing (e.g., pressure relief, check or the like) increases the incidences of breakage or failure. This shortcoming is particularly evident in environmentally challenging (caustic) environments, and in particular in aviation applications and wherein failure of a valve assembly can be particularly dangerous.

SUMMARY OF THE PRESENT INVENTION

The present invention discloses a combination and one piece spring and poppet assembly, built into such as a pressure relief or check valve assembly, and which provides improved durability and reliability over conventional, multi-part, spring and poppet assemblies. In particular, the one-piece design is suitable for use in more environmentally challenging (caustic) applications.

In a first application, a check valve housing incorporates an elongated and three dimensional shaped resilient body, positioned in linearly displaceable fashion and in order to obstruct a fluid path between an inlet and outlet, and between which the valve housing is situated. The one piece assembly is provided from any suitable and resilient materials, such as for example an elongated spring (stainless) steel material, this being turned helically and machined in an appropriate process for creating the poppet and coil spring at respective locations along its length. In specific use with a check valve, a plurality of exteriorly arrayed threads may be formed into the one-piece body, such as at an end opposite the poppet and between which is disposed the coiled springs, and by which the body may be threadably adjusted relative to further threads associated with the check valve housing, and in order to adjust a spring operating pressure.

The one-piece body is alternately capable of being press-fit into an associated valve housing, and without spring pressure adjustability. In the further instance of a pressure relief valve application, a rotatably disposed cap portion is provided for establishing the desired spring pressure, the one-piece body in this variant being seated at one end within the cap and axially biased relative to another threadably engaged housing portion associated with said pressure relief valve.

BRIEF DESCRIPTION OF THE DRAWINGS

Reference will now be made to the attached drawings, when read in combination with the following detailed description, wherein like reference numerals refer to like parts throughout the several views, and in which:

FIG. 6 is an exploded view in cutaway of a pressure relief valve incorporating the one-piece spring and poppet according to a further design embodiment of the present inventions;

FIG. 7 is an assembled cutaway view illustrating the spring/poppet in a first seated and flow interrupting arrangement; and FIG. 8 is a succeeding illustration of the spring/poppet in a linearly displaced and unseating direction, thereby creating a pressure relief flow.

DETAILED DESCRIPTION OF THE PREFERRED EMBODIMENTS

Figure 1:
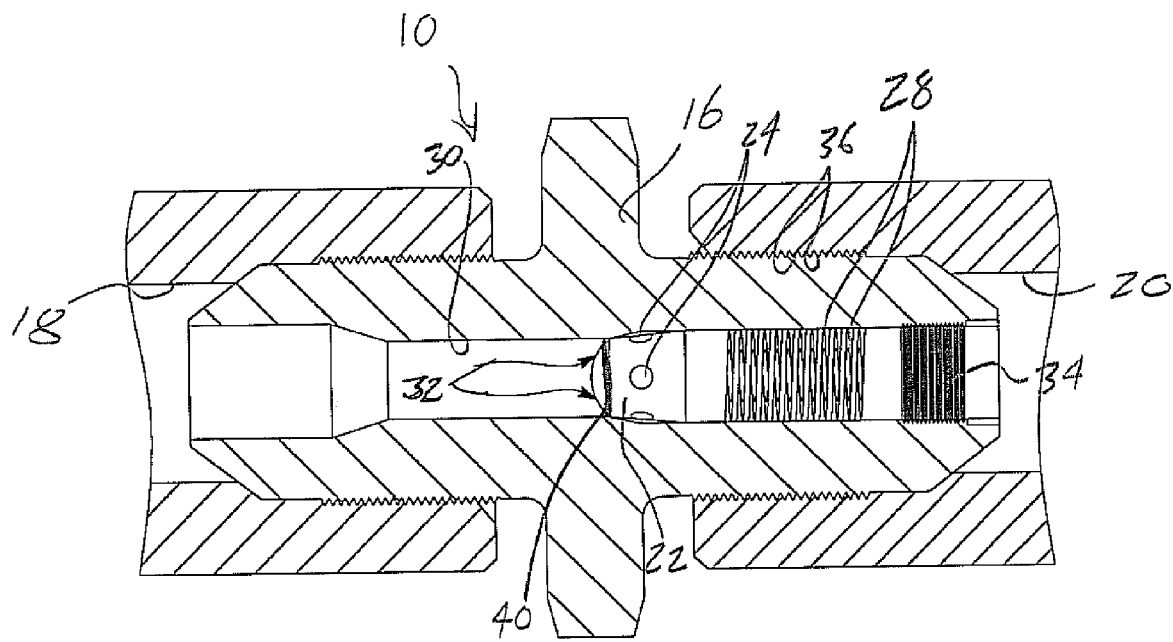
FIG. 1 is a cutaway plan view illustration of a check valve assembly incorporating the one-piece spring and poppet according to a first preferred embodiment of the present inventions.

Referring now to FIG. 1, a cutaway plan view illustration is shown at 10 of a check valve assembly incorporating the one-piece spring and poppet according to a first preferred embodiment of the present inventions. As previously described, the present invention discloses a one-piece and integrally constructed seating portion, this including a poppet and spring, which is an improvement over prior art assemblies in terms of useful life and durability.

Figure 2:
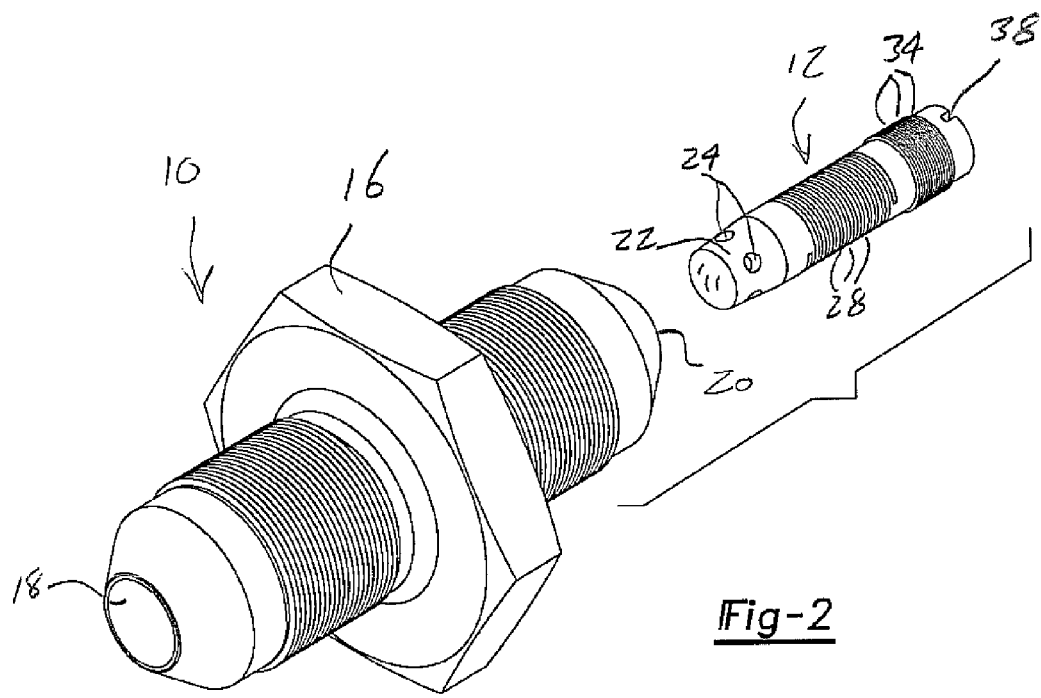
FIG. 2 is an exploded view illustrating the check valve arrangement of FIG. 1.
Figure 3:
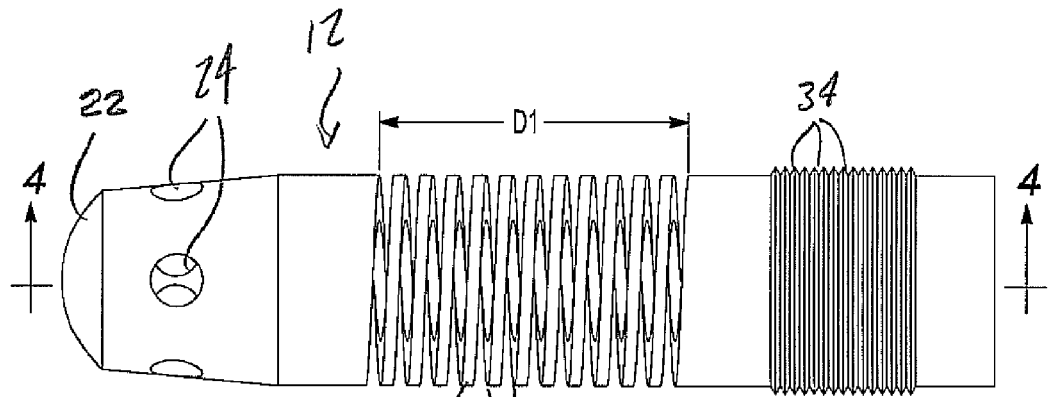
FIG. 3 is a plan view of the combined spring and poppet arrangement of the present inventions shown in FIG. 1.
Figure 4:
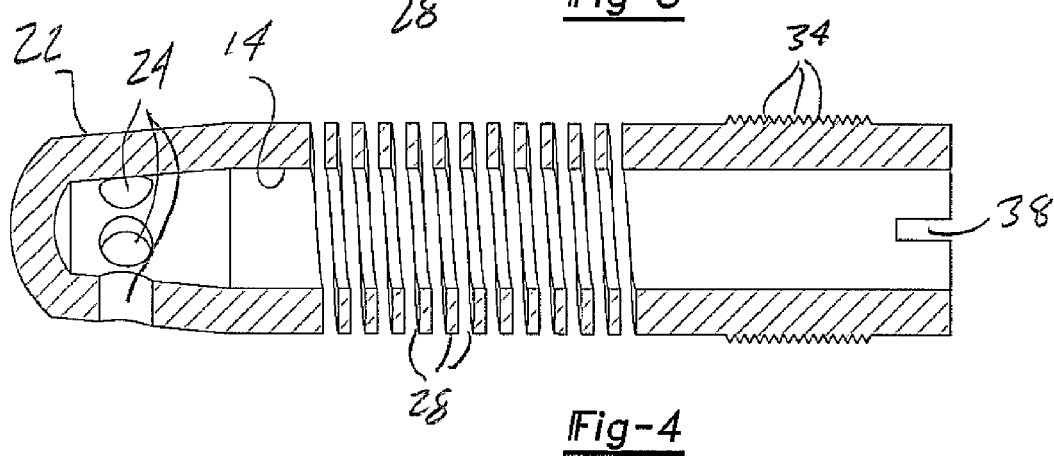
FIG. 4 is a cutaway view taken along line 4-4 of FIG. 3.
Figure 5:
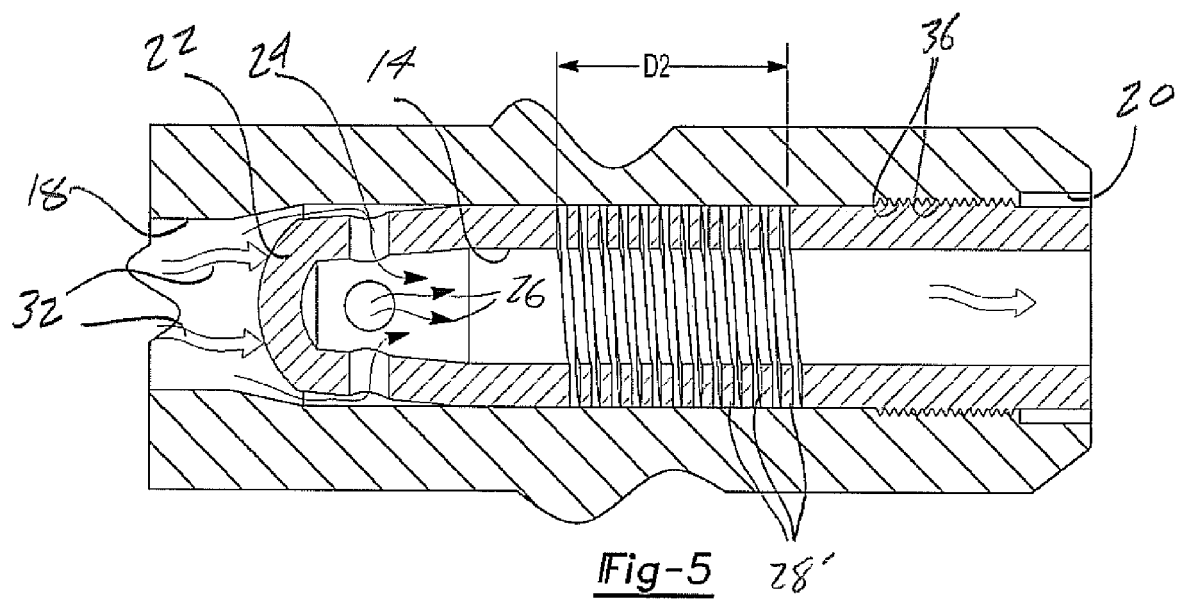
FIG. 5 is an enlarged operational illustration, similar to that shown in FIG. 1, and further showing the combined spring and poppet in a linearly displaced/unseating and compressed condition according to the present inventions.

Referring again to FIG. 1, as well as successively to each of FIGS. 2-5, the one-piece assembly is provided as a three dimensional shaped body, typically rounded and elongated as generally referenced at 12 in FIG. 2, and which is constructed of a resilient material, such as for example a stainless spring steel or a durable plastic. An advantage of the present invention is the ability to produce the combined and integrally formed body 12 of a single material, this again reducing the part count of the spring biased valve seat/poppet, as well as providing an assembly more suitable for use in environmentally challenging applications.

As will be described subsequently in further detail, the one piece body 12 is produced, according to a preferred and associated method of manufacture, by turning within an associated process (such as conventionally known to includes a CNC lathe operation or other suitable process), while being machined (such as further by a helically applied knife) to remove material from the tube stock to create the overall angled poppet and integral coil springs at respective locations along its length. The body 12, in use with a check valve arrangement further typically includes a hollow elongated interior, adopting a substantially sleeve shape (see inner wall 14 in each of cutaway FIGS. 4 and 5) and, as will be described, is installed within an interior housing of a check valve 16 in order to fluidly communicate a fluid flow inlet 18 with a fluid flow outlet 20 (see FIG. 1). The inlet 18 and outlet 20 are represented in FIG. 1 by associated fluid lines, and such as which is further shown to exhibit threaded ends within which associated exterior and opposite ends of the check valve housing 16 are threadably interengaged.

As particularly shown, the one-piece body 12 includes a forward and rounded (reduced diameter) end generally corresponding to a poppet 22. A plurality of annularly disposed and circumferentially spaced apart apertures 24 are defined about an intermediate axial location of the poppet 22 and, upon unseating of the same, cause fluid flow 26 (see cutaway of FIG. 5) to be communicate through the hollowed interior of the body 12 through the fluid outlet 20.

The integrally formed body 12 further includes a plurality of intermediately positioned and helically machined coils 28. The coils 28 exhibit a normal unstressed (i.e., non-compressed) dimensional distance D1 (see FIG. 3). Upon being installed in operative fashion within the check valve housing 16, i.e. an interior extending passageway 30 (FIG. 1) within which the body 12 seats, a selected degree of fluid inlet pressure 32 applied against the poppet 22 causes the poppet to unseat, through compression of the integrally formed coils to a position 28' in FIG. 5 and corresponding to a reduced linear distance D2 associated with the valve in an open and flow permitting condition.

In specific use with a check valve, a plurality of exteriorly arrayed threads 34 are further machined (such as again in helically turned fashion) into the one-piece body, such as at an end location thereof opposite the poppet 22 and between which is disposed the plurality of coiled springs 28. Additional interiorly disposed threads 36 (see in particular FIGS. 1 and 5) are defined within a selected interior end of the check valve 16 (as shown proximate the outlet flow location) and by which the interiorly positioned body 12 is rotatably/threadably adjustable and in order to pre-adjust a spring operating pressure (by pre-compressing the spring coils 28 a selected preset amount). This is further facilitated by notching an associated end of the body 12 being notched (see at 38 in FIG. 2) thereby permitting rotative engagement of the body by such as a flat head screwdriver.

The present invention further contemplates a simple press-fit arrangement whereby the body 12 is installed into the valve housing without any preset adjustability. As further shown in FIG. 1, a seal 40 (such as a rubberized O-ring or the like) can be employed in proximity to the poppet seating location relative to the fluid inlet and to provide a fluid tight arrangement in the closed/seated position.

Referring now to FIG. 6, an exploded view is shown at in cutaway of a further variant of the present invention, and whereby a modified one-piece body (see as further generally referenced at 42) is incorporated into a pressure relief valve arrangement. In particular, the relief valve includes a rotatably adjustable cap 44 (see further hex head adjustability at 46). An end of the one-piece body 42 is abuttingly seated (see at 47) against an inside end wall location of the first relief valve component (e.g. cap 44).

A further body portion of the relief valve is shown at 48 and which includes an inlet 50 and an outlet 52 associated with a typical pressure relief arrangement. A normal fluid flow line is, as is conventionally known but not illustrated herein, in communication with the fluid inlet 50.

The one-piece inner valve seating body 42, according to the pressure relief variant, differs in some respects from that previously described at 12 in the check valve variant, in particular in that the body 42 does not provide for fluid flow relative to its axially extending length. Rather, the body 42 includes an annularly rounded/reduced diameter forward end 52 corresponding to a poppet seating location. An intermediate plurality of helically machined or otherwise formed coils 54 are also provided.

Unlike the variant 12 in FIG. 1, the one-piece body 42 does not include additional exteriorly configured adjustment threads. Rather, the function of spring pre-adjustability is again provided by the body 42 being seated in sandwiching fashion between the portions 44 and 48 of the relief valve. Aligning interior channel portions (see at 56 and 58, respectively) associated with the relief valve components 44 and 48 seat the one-piece body 42, and further pre-stress the coils 54 by turning the hex head portion 46, this rotatably interengaging the valve component 44 relative to the further component 48 by means of interengaging threads 60 and 62 (as further best shown in the exploded view of FIG. 6). As also described in reference to the check valve variant, the relief valve components 44 and 48 may also be fixedly secured relative to one another and so that the sandwiched and interiorly seated body 42 does not exhibit any pre-stressing.

As further illustrated in the assembled cutaway view of FIG. 7, the one-piece combined spring/poppet 42 is shown in a first seated and flow interrupting arrangement, and by which a fluid inlet pressure is represented at 64. An O-ring 66 or like fluid sealing component is provided in proximity to the poppet 52 in order to retain its sealing characteristics in the closed position and the inner channel wall 58 of the secondary relief valve component 48 typically will further include a corresponding narrowing location, see at 68 for matingly seating the poppet 52.

Referring further to FIG. 8, a succeeding illustration of the one-piece body is shown in a linearly displaced and unseating direction of the poppet 52, and further by which the plurality of coils are compressed (as shown at 54') thereby creating a pressure relief flow 70. The configuration of the poppet 52 further differs from the check valve variant in that no flow through apertures are formed therein, it being illustrated that outlet flow simply occurs in angular fashion through the outlet line 52.

The present invention further discloses an associated method for producing a one-piece spring and poppet assembly for use in a valve housing, the method including the steps of selecting an elongated and rounded cross sectional body constructed from a resilient material, and turning the body concurrent with machining material therefrom, the step of machining further comprising forming a forward-most poppet and an integral spring biasing portion. Additional method steps include machining a plurality of threads along a further selected location of the body, forming the poppet with a reduced diameter forward end and, in the specific instance of a check valve variant, forming a plurality of apertures in circumferentially spaced apart and intermediate locations associated with the poppet and which communicate fluid flow to a hollow interior associated with the body.

Having described my invention, other and additional preferred embodiments will become apparent to those skilled in the art to which it pertains, and without deviating from the scope of the appended claims. In particular, the one-piece body accordingly to either variant described herein can, in addition to a preferred turning/machining operation, potentially be manufactured according to other processes, potentially including casting, injection molding, stamping or the like, and provided the necessary characteristics of spring resiliency and material durability are maintained.

It is also contemplated that material composites can further be utilized into the one-piece construction, according to any of the article structure or methodology described above, and such that the necessary operational properties are maintained. Further still, the present invention also contemplates a completed valve assembly including the one-piece combined poppet/spring, as well as other retrofit applications whereby a spring such as described herein can be installed into an existing valve construction and in substitution of prior art poppet/spring designs.

I claim:

1. A combined spring and poppet assembly incorporated into a valve housing which communicates with a fluid inlet and outlet, said assembly comprising:

an elongated, three dimensional shaped and resilient one piece body positioned in linearly displaceable fashion within the valve housing and along a path established between the fluid inlet and outlet;

the valve housing having a specified shape and size and further having a plurality of interiorly disposed threads associated with a selected interior location which rotatably interengage a further plurality of exteriorly disposed threads associated with a location of said elongated body to vary a selected spring pressure;

said body exhibiting a substantially cylindrical shape and including a forward-most poppet, seating against the fluid inlet, a plurality of flow apertures being defined along circumferentially spaced and intermediate locations associated with said poppet and such that, upon unseating of said poppet from the inlet, the fluid flowing through an open interior of said body to communicate said inlet with said outlet; and said one piece body further comprising an integral spring biasing portion being located intermediate said forward-most located poppet and said exteriorly disposed threads so that, upon a pressure in the fluid inlet exceeding a predetermined value, said poppet being caused to unseat from the inlet and to displace linearly and in compressing fashion against said integral spring portion concurrent with fluid flow across the outlet.

2. The invention as described in claim 1, said body having a specified shape and size and being installed into a valve housing interior from a direction associated with the fluid outlet.

3. The invention as described in claim 1, said body having a specified shape and size exhibiting a hollow interior, said poppet further comprising a rounded and reduced-diameter forward end.

4. The invention as described in claim 3, further comprising an annular seal disposed within an interior of the housing in proximity to said poppet.

5. The invention as described in claim 1, said body exhibiting a specified shape and size and being constructed from a material selected from a group including a spring steel and a resilient plastic.

6. A valve assembly incorporating a combined spring and poppet situated within a path defined by a fluid inlet and outlet, said assembly comprising:

a housing having a specified shape and size and defining an interior passageway communicating the fluid inlet and outlet;

said valve housing having a specified shape and size and further comprising a check valve, a plurality of interiorly disposed threads associated with a selected interior location of said check valve;

an elongated, three dimensional shaped and resilient body positioned in linearly displaceable fashion within the valve housing and in obstructing fashion along the passageway established between the fluid inlet and outlet;

said body including a forward-most poppet, seating against the fluid inlet, said one piece body further comprising an integral spring biasing portion, a further plurality of exteriorly disposed threads associated with a location of said elongated body and rotatably interengaging said interiorly disposed threads of said check valve to vary a selected spring pressure; and said body exhibiting a substantially cylindrical shape, said integrally formed spring biasing portion being located intermediate said forward-most located poppet and said exteriorly disposed threads;

wherein, and upon a pressure in the fluid inlet exceeding a predetermined value, said poppet being caused to unseat from the inlet and to displace linearly against said spring portion concurrent with fluid flow occurring across the outlet.

7. The invention as described in claim 6, said body having a specified shape and size and being installed into a valve housing interior from a direction associated with the fluid outlet.

8. The invention as described in claim 6, said housing having a specified shape and size and further defining a pressure relieve valve including a rotatably disposed cap portion for establishing a predetermined spring pressure.

9. The invention as described in claim 8, said housing exhibiting a specified shape and size with a first and second threadably engagable parts between which is located said elongated and linearly displaceable body.

* * * * *